(12) United States Patent  (10) Patent No.: US 8,314,692 B2
Riegelman et al.  (45) Date of Patent: Nov. 20, 2012

(54) AXIAL RELATIVE SPEED INDICATOR

(75) Inventors: Alexander Thomas Riegelman, Berkley, MI (US); Michael Joseph Levy, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 397 days.

(21) Appl. No.: 12/613,667

(22) Filed: Nov. 6, 2009

(65) Prior Publication Data

US 2011/0109449 A1  May 12, 2011

(51) Int. Cl.
*B60Q 1/00*  (2006.01)
(52) U.S. Cl. ........................................ 340/441
(58) Field of Classification Search .................. 340/438, 340/441, 461, 462, 691.6, 965–978; 701/29
See application file for complete search history.

(56) References Cited

U.S. PATENT DOCUMENTS

| | | | | |
|---|---|---|---|---|
| 5,291,195 A | * | 3/1994 | Gross | 340/958 |
| 5,457,439 A | * | 10/1995 | Kuhn | 340/435 |
| 6,515,596 B2 | * | 2/2003 | Awada | 340/905 |
| 6,633,811 B1 | | 10/2003 | Aumayer | |
| 6,728,605 B2 | | 4/2004 | Lash et al. | |
| 6,778,074 B1 | | 8/2004 | Cuozzo | |
| 6,845,317 B2 | | 1/2005 | Craine | |
| 6,862,524 B1 | * | 3/2005 | Nagda et al. | 701/420 |
| 7,178,479 B1 | * | 2/2007 | Richter | 116/288 |
| 7,589,643 B2 | | 9/2009 | Gagci et al. | |
| 2002/0126023 A1 | * | 9/2002 | Awada | 340/905 |
| 2004/0178928 A1 | * | 9/2004 | Butzer et al. | 340/908 |
| 2005/0174226 A1 | | 8/2005 | Heyden | |
| 2007/0001830 A1 | * | 1/2007 | Dagci et al. | 340/438 |
| 2010/0217477 A1 | * | 8/2010 | Brody | 701/29 |

FOREIGN PATENT DOCUMENTS

| | | |
|---|---|---|
| CA | 2186790 A1 | 3/1998 |
| DE | 3315386 A1 | 10/1984 |
| DE | 4325721 A1 | 2/1995 |
| DE | 19901808 A1 | 7/2000 |
| DE | 19906419 A1 | 8/2000 |
| EP | 1162102 A2 | 12/2001 |
| GB | 2301924 A | 12/1996 |
| GB | 2375176 A | 6/2002 |
| JP | 10232140 A | 9/1998 |
| KR | 20040013758 A | 2/2004 |
| SE | 8803015 A | 1/1990 |

* cited by examiner

*Primary Examiner* — Benjamin C Lee
*Assistant Examiner* — Sigmund Tang
(74) *Attorney, Agent, or Firm* — Quinn Law Group, PLLC

(57) ABSTRACT

A speedometer displays a numeric representation of the speed of a vehicle, and further displays an indicator above the numeric representation to indicate the speed of the vehicle is above an established speed limit, or displays the indicator below the numeric representation to indicate the speed of the vehicle is below the established speed limit. The chromaticity of the indicator may be varied in relation to a magnitude of a speed differential between the speed of the vehicle and the speed limit to visually and intuitively indicate to an operator of the vehicle the magnitude of the speed differential.

20 Claims, 2 Drawing Sheets

AXIAL RELATIVE SPEED INDICATOR

TECHNICAL FIELD

The invention generally relates to a speedometer, and more specifically to a method of and an apparatus for indicating a speed of a vehicle relative to a speed limit.

BACKGROUND OF THE INVENTION

Vehicles include a speedometer to indicate a speed of the vehicle. The speedometer typically includes either a standard dial type speedometer or a speedometer. In the past, in order to determine if the speed of the vehicle is above or below a legal speed limit, an operator of the vehicle had to watch for, identify and read a posted sign along an edge of the roadway to determine the legal speed limit, and then correlate the legal speed limit to the speed displayed on the speedometer to determine if the speed of the vehicle is above or below the legal speed limit. This requires a certain cognitive load of the operator.

Recently, some vehicles have been equipped to display the legal speed limit to the operator. The legal speed limit is displayed as a numeric value on an instrument cluster of the vehicle. However, the operator must still correlate the displayed numeric speed limit to the displayed speed of the vehicle to determine if the vehicle is traveling above or below the legal speed limit, which still requires a certain cognitive load of the operator.

SUMMARY OF THE INVENTION

A method of indicating a speed of a vehicle relative to a speed limit is disclosed. The method includes displaying a numeric representation of the speed of the vehicle. The method further includes displaying an indicator above the numeric representation when the speed of the vehicle is greater than the speed limit to visually indicate a positive speed differential between the speed of the vehicle and the speed limit, or displaying the indicator below the numeric representation when the speed of the vehicle is less than the speed limit to visually indicate a negative speed differential between the speed of the vehicle and the speed limit.

In another aspect of the invention, a method of displaying a speed of a vehicle is disclosed. The method includes measuring the speed of the vehicle. The method further includes determining the speed limit. The method further includes calculating a speed differential between the speed of the vehicle and the speed limit. The speed differential is a positive speed differential when the speed of the vehicle is greater than the speed limit. The speed differential is a negative speed differential when the speed of the vehicle is less than the speed limit. The method further includes displaying a numeric representation of the speed of the vehicle; and displaying an indicator above the numeric representation when the speed differential is calculated to be a positive speed differential to visually indicate the speed of the vehicle is greater than the speed limit, or below the numeric representation when the speed differential is calculated to be a negative speed differential to visually indicate the speed of the vehicle is less than the speed limit.

In another aspect of the invention, a vehicle is disclosed. The vehicle includes a speedometer. The speedometer includes a vehicle speed display area configured for displaying a numerical representation of a speed. The speedometer further includes a positive speed differential display area. The positive speed differential display area is vertically offset above the vehicle speed display area. The positive speed differential display area is configured for indicating a magnitude of a speed differential between the speed and a speed limit when the speed is greater than the speed limit. The speedometer further includes a negative speed differential display area. The negative speed differential display area is vertically offset below the vehicle speed display area. The negative speed differential display area is configured for indicating a magnitude of the speed differential when the speed is less than the speed limit. The speedometer further includes an equilibrium speed display area. The equilibrium speed display area is laterally offset from the vehicle speed display area. The equilibrium speed display area is configured for indicating the speed is equal to the speed limit.

Accordingly, the speedometer of the invention displays the numeric representation of the speed of the vehicle, and graphically displays the indicator either above or below the numeric representation to visually indicate whether the speed of the vehicle is above or below the speed limit respectively. Accordingly, the subject invention provides an easily understandable and readable display the provides information on both the speed of the vehicle and the speed of the vehicle relative to the speed limit, which requires less cognitive load of the operator to understand the information.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
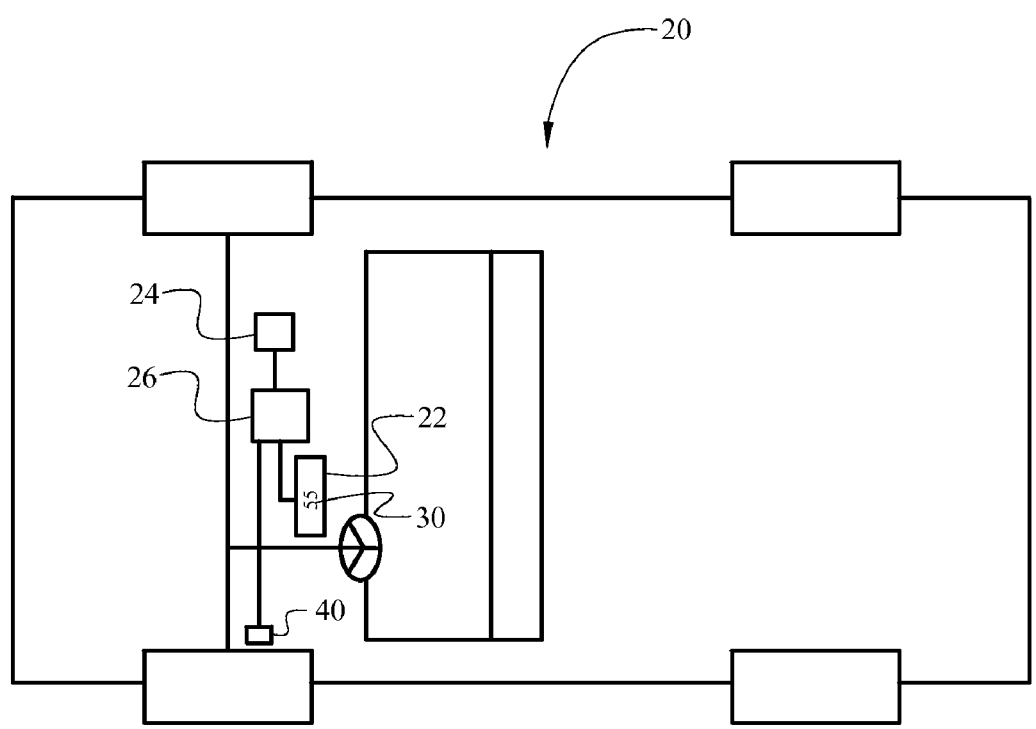
FIG. 1 is a schematic plan view of a vehicle.

Referring to the Figures, wherein like numerals indicate corresponding parts throughout the several views, a vehicle is shown generally at 20. The vehicle 20 includes a speedometer 22, a Global Positioning Satellite (GPS) system 24, and a controller 26.

The GPS system 24 is configured for calculating a position of the vehicle 20. As is well known, the GPS system 24 triangulates the position of the vehicle 20 based upon direction signals received from orbiting satellites. The GPS system 24 may include any suitable system capable of calculating the position of the vehicle 20 based upon the received direction signals. The specific details of the GPS system 24, the operation of the GPS system 24 and the incorporation of the GPS system 24 into the vehicle 20 are well known in the art, and are therefore not described in detail herein.

The controller 26 is in communication with the speedometer 22 and the GPS system 24. The controller 26 is configured for controlling the speedometer 22, and is also configured for correlating the position of the vehicle 20 to an established speed limit associated with the location of the vehicle 20. The controller 26 may include a computer, memory, software and any other components necessary to control the speedometer 22 and communicate with the GPS system 24.

The controller 26 may correlate the position of the vehicle 20 calculated by the GPS system 24 to a speed limit by, for example, referencing a database stored in the memory of the controller 26. The database may include, but is not limited to, the location of pre-identified roadways and established speed limits associated with the pre-identified roadways. Accordingly, once the controller 26 receives the information from the GPS system 24 related to the location of the vehicle 20, the controller 26 can correlate the position of the vehicle 20 to a specific roadway. Once the specific roadway is identified, the controller 26 may reference the established speed limit, also stored in the memory of the controller 26, for the specific roadway.

The speedometer 22 may include any suitable type of speedometer 22, but preferably includes a digital speedometer 22. The digital speedometer 22 may include any suitable type of display, including but not limited to, an LCD display, an LED display or a plasma screen display. Preferably, but not necessarily, the speedometer 22 is capable of displaying a variety of colors and/or moveable shapes.

The speedometer 22 includes a vehicle speed display area 28, which is configured for displaying a representation 30 of the speed of the vehicle 20. Preferably, the representation 30 of the speed of the vehicle 20 includes a numerical representation 30 of the speed of the vehicle 20. For example, if the vehicle 20 is traveling at fifty five miles per hour, the vehicle speed display area 28 may display "55", indicating the speed of the vehicle 20. However, it should be appreciated that the representation 30 of the speed of the vehicle 20 may include some other representation 30, such as a dial or the like.

The speedometer 22 further includes a positive speed differential display area 32, which is vertically offset above the vehicle speed display area 28. The positive speed differential display area 32 is configured for displaying an indicator 34 that indicates a magnitude of a speed differential when the speed is greater than the speed limit, i.e., a positive speed differential. The speed differential is the difference between the speed of the vehicle 20 and the speed limit. The positive speed differential corresponds to the vehicle 20 traveling faster than the speed limit. A negative speed differential corresponds to the vehicle 20 traveling slower than the speed limit.

The speedometer 22 further includes a negative speed differential display area 36, which is vertically offset below the vehicle speed display area 28. The negative speed differential display area 36 is configured for displaying the indicator 34 to indicate the magnitude of the speed differential when the speed of the vehicle 20 is less than the speed limit, i.e., the negative speed differential.

The speedometer 22 further includes an equilibrium speed display area 38, which is laterally offset from the vehicle speed display area 28, i.e., the equilibrium speed display area 38 is disposed adjacent one or both sides of the vehicle speed display area 28. The equilibrium speed display area 38 is configured for displaying the indicator 34 to indicate the speed is equal to the speed limit.

As shown, the positive speed differential display area 32, the negative speed differential display area 36 and the equilibrium speed display area 38 are aligned along a circular path concentric with a center of the vehicle speed display area 28, and each define a semi-circular shape concentric with the center of the vehicle speed display area 28. However, it should be appreciated that the positive speed differential display area 32, the negative speed differential display area 36 and the equilibrium speed display area 38 may be orientated relative to each other and the vehicle speed display area 28 in some manner other than shown or described herein.

Preferably, the positive speed differential display area 32, the negative speed differential display area 36 and the equilibrium speed display area 38 each include an adjustable chromaticity. As used herein, chromaticity is defined as the quality of color characterized by the dominant and complimentary wavelength of the color and the purity of the color. Additionally, as used herein, the chromaticity of the indicator 34 further includes the color of the indicator 34, the intensity of the color of the indicator 34 and the length, width and/or shape of the indicator 34. Accordingly, it should be appreciated that adjusting the chromaticity of the indicator 34 may include, but is not limited to, adjusting the brightness and/or changing the color of the indicator 34; or changing the length, width or shape of the indicator 34.

The subject invention further discloses a method of indicating the speed of the vehicle 20 relative to the speed limit. The method includes measuring the speed of the vehicle 20. The speed of the vehicle 20 is equal to the distance traveled by the vehicle 20 over a period of time. The speed of the vehicle 20 may be measured in any suitable manner known to those skilled in the art, including but not limited to, using a speed sensor 40 in communication with the controller 26. The measured speed of the vehicle 20 is communicated to the controller 26.

The method further includes displaying a representation 30 of the measured speed of the vehicle 20 in the vehicle speed display area 28. As described above and shown in FIGS. 2-8, the representation 30 preferably includes a numeric representation 30. Accordingly, the numeric value displayed in the vehicle 20 display area of FIGS. 2-8 each represent the speed of the vehicle 20.

The method further includes determining the speed limit. The speed limit may be determined in any suitable manner. As described above, determining the speed limit may include locating the position of the vehicle 20 on a pre-identified system of roadways with the GPS system 24, and correlating the location of the vehicle 20 on the pre-identified system of roadways to an established speed limit associated with the location of the vehicle 20 on the pre-identified system of roadways. However, it should be appreciated that the speed limit may be determined in some other manner, such as by but not limited to, referencing transmitters embedded in the roadway.

The method further includes establishing a horizontal equilibrium reference line extending through a center of the numeric representation 30. The horizontal equilibrium reference line defines the horizontal center of the vehicle speed display area 28. Accordingly, the positive speed differential display area 32 is disposed above the horizontal equilibrium reference line, the negative speed differential display area 36 is disposed below the horizontal equilibrium reference line and the equilibrium speed display area 38 is disposed on the horizontal equilibrium reference line.

The method further includes calculating the speed differential between the speed of the vehicle 20 and the speed limit. As described above, the speed differential is a positive speed differential when the speed of the vehicle 20 is greater than the speed limit and the speed differential is a negative speed differential when the speed of the vehicle 20 is less than the speed limit. The speed differential may be calculated by the controller 26 using appropriate software.

The method further includes displaying the indicator 34. The indicator 34 is displayed above the representation 30 of the speed of the vehicle 20 in the positive speed differential display area 32 when the speed of the vehicle 20 is greater than the speed limit. Displaying the indicator 34 above the representation 30 of the speed of the vehicle 20 visually and intuitively indicates a positive speed differential between the speed of the vehicle 20 and the speed limit. Alternatively, the indicator 34 is displayed below the representation 30 of the speed of the vehicle 20 in the negative speed differential display area 36 when the speed of the vehicle 20 is less than the speed limit. Displaying the indicator 34 below the representation 30 of the speed of the vehicle 20 visually and intuitively indicates a negative speed differential between the speed of the vehicle 20 and the speed limit. The indicator 34 is displayed laterally offset from the representation 30 of the speed of the vehicle 20, along the horizontal equilibrium reference line and in the equilibrium speed display area 38, when the speed of the vehicle 20 is equal to the speed limit.

The controller 26 determines where the indicator 34 is displayed, based on the measured speed of the vehicle 20 received and the determined speed limit, i.e., the controller 26 determines whether the indicator 34 is displayed in the positive speed differential display area 32, the negative speed differential display area 36, or the equilibrium speed display area 38. The indicator 34 may include one or more lights, a symbol, one or more bars, or some other shape designed to visually indicate and alert the driver without requiring significant cognitive thought.

The method further includes calculating an absolute value of the speed differential to define a magnitude of the speed differential. The absolute value of the speed differential is the numeric difference between the speed of the vehicle 20 and the speed limit, without regards to whether the speed of the vehicle 20 is above or below the speed limit. The controller 26 may use appropriate software to calculate the magnitude of the speed differential.

The method further includes varying the chromaticity of the indicator 34 in relation to the magnitude of the speed differential. As described above, varying the chromaticity of the indicator 34 includes, but is not limited to, varying or completing changing the color of the indicator 34, changing a length of the indicator 34, changing a width of the indicator 34, changing a symbol of the indicator 34. The chromaticity of the indicator 34 is changed to indicate a change in the magnitude of the speed differential. For example, varying the chromaticity of the indicator 34 in relation to the magnitude of the speed differential may include increasing the length of the indicator 34 to correspond to an increase in the magnitude of the speed differential. Accordingly, the larger length of the indicator 34 intuitively indicates a larger speed differential between the speed of the vehicle 20 and the speed limit. Similarly, varying the chromaticity of the indicator 34 in relation to the magnitude of the speed differential includes changing the color of the indicator 34 to correspond to an increase in the magnitude of the speed differential. The color of the indicator 34 may change shades and or complete colors as the magnitude of the speed differential changes. For example, the color of the indicator 34 may change from a pale yellow for a slight magnitude of the speed differential to a bright red for a high magnitude of the speed differential. It should be appreciated that varying the chromaticity of the indicator 34 may including varying multiple properties of the chromaticity of the indicator 34, i.e., varying the chromaticity may include changing both the color and the length of the indicator 34. The controller 26 continuously monitors and calculates the magnitude of the speed differential, and varies the chromaticity of the indicator 34 accordingly.

Figure 2:
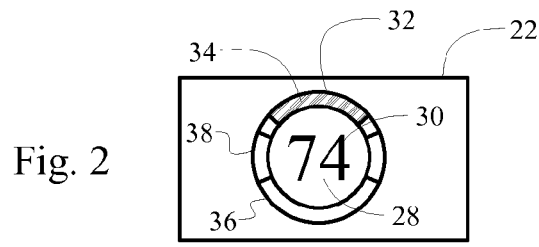
FIG. 2 is a schematic plan view of a speedometer indicating a first positive speed differential.
Figure 3:
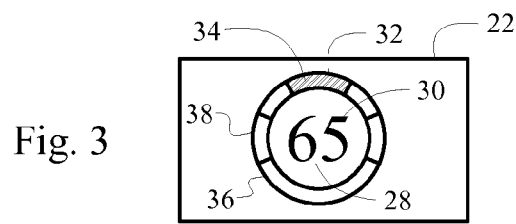
FIG. 3 is a schematic plan view of the speedometer indicating a second positive speed differential.
Figure 4:
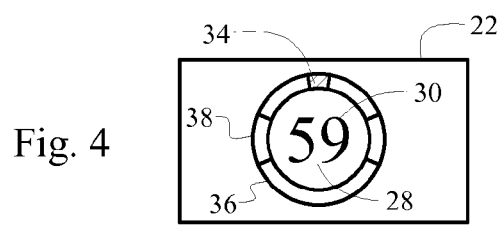
FIG. 4 is a schematic plan view of the speedometer indicating a third positive speed differential.
Figure 5:
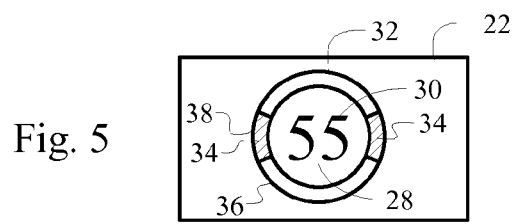
FIG. 5 is a schematic plan view of the speedometer indicating a speed of the vehicle is equal to a speed limit.
Figure 6:
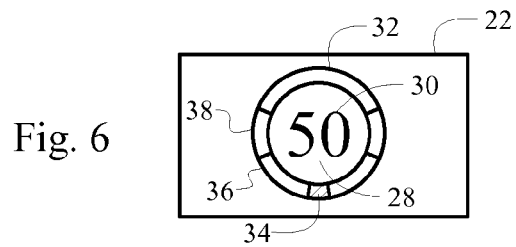
FIG. 6 is a schematic plan view of the speedometer indicating a first negative speed differential.
Figure 7:
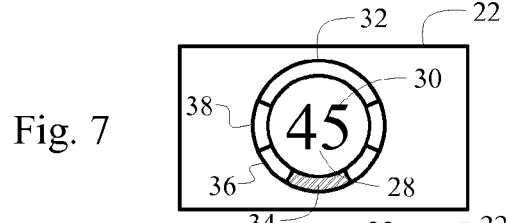
FIG. 7 is a schematic plan view of the speedometer indicating a second negative speed differential.
Figure 8:
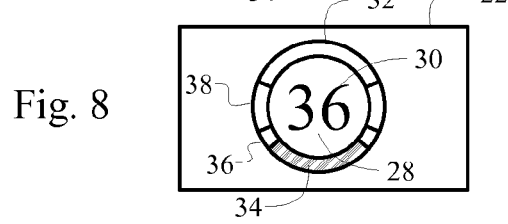
FIG. 8 is a schematic plan view of the speedometer indicating a third negative speed differential.

Referring to FIGS. 2-8, the speedometer 22 is shown with the indicator 34 in different positions and with varying chromaticity of the indicator 34. Throughout FIGS. 2-8, the speed limit is determined to be fifty-five miles per hour. FIGS. 2-4 show the indicator 34 in the positive speed differential display area 32, with varying levels of chromaticity. Accordingly, the speedometer 22 of FIGS. 2-4 visually and intuitively indicates that the speed of the vehicle 20 is greater than the speed limit, and the chromaticity of the indicator 34 in each of FIGS. 2-4 visually and intuitively indicates a different magnitude of the speed differential. FIG. 5 shows the indicator 34 in the equilibrium speed display area 38. The speedometer 22 of FIG. 5 visually and intuitively indicates that the speed of the vehicle 20 is equal to the speed limit. FIGS. 6-8 show the indicator 34 in the negative speed differential display area 36, with varying levels of chromaticity. Accordingly, the speedometer 22 of FIGS. 6-8 visually and intuitively indicates that the speed of the vehicle 20 is less than the speed limit, and the chromaticity of the indicator 34 in each of FIGS. 6-8 visually and intuitively indicates a different magnitude of the speed differential.

While the best modes for carrying out the invention have been described in detail, those familiar with the art to which this invention relates will recognize various alternative designs and embodiments for practicing the invention within the scope of the appended claims.

The invention claimed is:

1. A method of indicating a speed of a vehicle relative to a speed limit, the method comprising:
    displaying a representation of the speed of the vehicle; and
    displaying an indicator above the representation when the speed of the vehicle is greater than the speed limit to visually indicate a positive speed differential between the speed of the vehicle and the speed limit, and below the representation when the speed of the vehicle is less than the speed limit to visually indicate a negative speed differential between the speed of the vehicle and the speed limit.

2. A method as set forth in claim 1 further comprising calculating an absolute value of the speed differential to define a magnitude of the speed differential.

3. A method as set forth in claim 2 further comprising varying the chromaticity of the indicator in relation to the magnitude of the speed differential.

4. A method as set forth in claim 3 wherein the indicator includes a length and wherein varying the chromaticity of the indicator in relation to the magnitude of the speed differential includes increasing the length of the indicator to correspond to an increase in the magnitude of the speed differential.

5. A method as set forth in claim 3 wherein the indicator includes a color and wherein varying the chromaticity of the indicator in relation to the magnitude of the speed differential includes changing the color of the indicator to correspond to an increase in the magnitude of the speed differential.

6. A method as set forth in claim 1 further comprising measuring the speed of the vehicle.

7. A method as set forth in claim 6 further comprising determining the speed limit.

8. A method as set forth in claim 7 wherein determining the speed limit includes locating a position of the vehicle on a pre-identified system of roadways.

9. A method as set forth in claim 8 wherein determining the speed limit includes correlating the location of the vehicle on the pre-identified system of roadways to an established speed limit associated with the location of the vehicle on the pre-identified system of roadways.

10. A method as set forth in claim 1 further comprising establishing a horizontal equilibrium reference line extending through a center of the representation with the indicator vertically offset above the horizontal equilibrium reference line when the speed differential is positive and the indicator is vertically offset below the horizontal equilibrium reference line when the speed differential is negative.

11. A method as set forth in claim 1 further comprising displaying the indicator laterally offset from the representation along the horizontal equilibrium reference line when the speed of the vehicle is equal to the speed limit.

12. A method of displaying a speed of a vehicle, the method comprising:
measuring the speed of the vehicle;
determining the speed limit;
calculating a speed differential between the speed of the vehicle and the speed limit, wherein the speed differential is a positive speed differential when the speed of the vehicle is greater than the speed limit and the speed differential is a negative speed differential when the speed of the vehicle is less than the speed limit;
displaying a representation of the speed of the vehicle; and
displaying an indicator above the representation when the speed differential is calculated to be a positive speed differential to visually indicate the speed of the vehicle is greater than the speed limit, and below the representation when the speed differential is calculated to be a negative speed differential to visually indicate the speed of the vehicle is less than the speed limit.

13. A method as set forth in claim 12 further comprising varying the chromaticity of the indicator in relation to a change in an absolute value of the speed differential, wherein the chromaticity of the indicator includes a length of the indicator and a color of the indicator.

14. A method as set forth in claim 13 wherein determining the speed limit includes locating a position of the vehicle on a pre-identified system of roadways and correlating the located position of the vehicle to an established speed limit associated with the location of the vehicle.

15. A vehicle comprising:
a speedometer comprising:
a vehicle speed display area configured for displaying a numerical representation of a speed;
a positive speed differential display area vertically offset above said vehicle speed display area and configured for indicating a magnitude of a speed differential between the speed and a speed limit when the speed is greater than the speed limit;
a negative speed differential display area vertically offset below said vehicle speed display area and configured for indicating a magnitude of the speed differential when the speed is less than the speed limit; and
an equilibrium speed display area laterally offset from said vehicle speed display area and configured for indicating that the speed is equal to the speed limit.

16. A vehicle as set forth in claim 15 further comprising a global positioning satellite system configured for calculating a position of the vehicle.

17. A vehicle as set forth in claim 16 further comprising a controller in communication with said speedometer and said global positioning satellite system and configured for controlling said speedometer and correlating the position of the vehicle to an established speed limit associated with the location of the vehicle.

18. A vehicle as set forth in claim 17 wherein said positive speed differential display area, said negative speed differential display area and said equilibrium speed display area are aligned along a circular path concentric with a center of said vehicle speed display area.

19. A vehicle as set forth in claim 17 wherein said positive speed differential display area, said negative speed differential display area and said equilibrium speed display area each define a semi-circular shape concentric with a center of said vehicle speed display area.

20. A vehicle as set forth in claim 17 wherein said positive speed differential display area, said negative speed differential display area and said equilibrium speed display area each include an adjustable chromaticity.

* * * * *